US012591570B2

(12) United States Patent
Bryson et al.

(10) Patent No.: US 12,591,570 B2
(45) Date of Patent: Mar. 31, 2026

(54) SYSTEMS AND METHODS FOR FINDING NEAREST NEIGHBORS

(71) Applicant: Samsung Electronics Co., Ltd., Suwon-si (KR)

(72) Inventors: Matthew Bryson, Los Gatos, CA (US); Vikas Sinha, Sunnyvale, CA (US); Manali Sharma, San Jose, CA (US); Ehsan Najafabadi, Gilroy, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/062,005

(22) Filed: Dec. 5, 2022

(65) Prior Publication Data

US 2024/0184778 A1 Jun. 6, 2024

Related U.S. Application Data

(60) Provisional application No. 63/419,300, filed on Oct. 25, 2022.

(51) Int. Cl.
*G06F 16/2453* (2019.01)
*G06F 18/2413* (2023.01)

(52) U.S. Cl.
CPC .... *G06F 16/2453* (2019.01); *G06F 18/24147* (2023.01)

(58) Field of Classification Search
CPC ...................... G06F 16/2453; G06F 18/24147
See application file for complete search history.

(56) References Cited

U.S. PATENT DOCUMENTS

| | | | |
|---|---|---|---|
| 7,889,914 B2 | 2/2011 | Regli et al. | |
| 11,113,291 B2 | 9/2021 | Gotmanov et al. | |
| 2010/0049674 A1 | 2/2010 | Zohar et al. | |
| 2020/0380038 A1 | 12/2020 | Rosset et al. | |
| 2021/0004589 A1* | 1/2021 | Turkelson | G06V 30/19173 |
| 2022/0083900 A1 | 3/2022 | Khanna | |
| 2022/0188028 A1 | 6/2022 | Mesnier et al. | |
| 2022/0207410 A1* | 6/2022 | Harary | G06N 20/00 |
| 2022/0245917 A1* | 8/2022 | Chun | G06V 10/774 |
| 2022/0383153 A1* | 12/2022 | Mahmoud | G06N 5/02 |
| 2023/0147805 A1* | 5/2023 | Groh | G06N 20/00 |
| | | | 706/12 |
| 2023/0273940 A1* | 8/2023 | Shu | G06F 16/24556 |
| | | | 707/600 |

FOREIGN PATENT DOCUMENTS

WO          2022037130 A1     2/2022

OTHER PUBLICATIONS

Imani, M. et al., "NNgine: Ultra-Efficient Nearest Neighbor Accelerator Based on In-Memory Computing", 2017, 8 pages, IEEE.

* cited by examiner

*Primary Examiner* — Etienne P Leroux
*Assistant Examiner* — Husam Turki Samara
(74) *Attorney, Agent, or Firm* — Womble Bond Dickinson (US) LLP

(57) ABSTRACT

Systems and methods for finding nearest neighbors. In some embodiments, the system includes a processing circuit. The processing circuit may be configured to perform a method, the method including: selecting, based on a first query vector, a selected method, the selected method being a nearest neighbor selection method; and performing the selected method to select a first nearest neighbor from a data set, based on the first query vector.

14 Claims, 6 Drawing Sheets

Select, based on a first query vector, a selected method, the selected method being a nearest neighbor selection method
305

Performing the selected method to select a first nearest neighbor from a data set, based on the first query vector
310

SYSTEMS AND METHODS FOR FINDING NEAREST NEIGHBORS

CROSS-REFERENCE TO RELATED APPLICATION(S)

The present application claims priority to and the benefit of U.S. Provisional Application No. 63/419,300, filed Oct. 25, 2022, entitled "DETERMINING OPTIMAL KNN ALGORITHM THROUGH SELECTION TECHNIQUES FOR STORAGE LOOKUP", the entire content of which is incorporated herein by reference.

FIELD

One or more aspects of embodiments according to the present disclosure relate to data processing, and more particularly to systems and methods for finding nearest neighbors.

BACKGROUND

In machine learning and certain other applications, a k nearest neighbor algorithm may be employed to find vectors, of a data set, that are near a query vector. For example, an input feature map to be classified (e.g., an image or a text string) may be converted to a vector, and each of a set of feature maps may similarly be converted into a vector, to form the data set. The k vectors, of the data set, that are nearest to input feature map to be classified may then be found using a k nearest neighbor algorithm.

It is with respect to this general technical environment that aspects of the present disclosure are related.

SUMMARY

According to an embodiment of the present disclosure, there is provided a system, including: a processing circuit, the processing circuit being configured to perform a method, the method including: selecting, based on a first query vector, a selected method, the selected method being a nearest neighbor selection method; and performing the selected method to select a first nearest neighbor from a data set, based on the first query vector.

In some embodiments, the selecting of the selected method includes selecting, by a classifier, the selected method.

In some embodiments, the method further includes performing a second method, different from the selected method, to select a second nearest neighbor from the data set, based on the first query vector.

In some embodiments, the method further includes training the classifier based on a difference between the first nearest neighbor and the second nearest neighbor.

In some embodiments, the classifier includes a neural network, and the training includes performing back-propagation.

In some embodiments, the method further includes performing a third method to select a third nearest neighbor from a data set, based on a second query vector; performing a fourth method, different from the third method, to select a fourth nearest neighbor from the data set, based on the second query vector; and training the classifier based on a difference between the third nearest neighbor and the fourth nearest neighbor.

In some embodiments, the system further includes processing a first number of query vectors between the processing of the first query vector and the processing of the second query vector.

In some embodiments, the first number is a constant.

In some embodiments, the first number is generated by a pseudorandom number generator.

In some embodiments, the first number is based on a measure of a difference between output of the selected method and output of the second method.

In some embodiments, the measure of the difference includes a Euclidean distance.

In some embodiments, the measure of the difference includes a Manhattan distance.

In some embodiments, the measure of the difference includes a cosine similarity.

In some embodiments, the selecting of the selected method includes selecting the selected method based on a principal component analysis conversion error rate.

In some embodiments, the selecting of the selected method includes selecting the selected method based on a linear discriminant analysis.

According to an embodiment of the present disclosure, there is provided a method, including: selecting, based on a first query vector, a selected method, the selected method being a nearest neighbor selection method; and performing the selected method to select a first nearest neighbor from a data set, based on the first query vector.

In some embodiments, the selecting of the selected method includes selecting, by a classifier, the selected method.

In some embodiments, the method further includes performing a second method, different from the selected method, to select a second nearest neighbor from the data set, based on the first query vector.

In some embodiments, the method further includes training the classifier based on a difference between the first nearest neighbor and the second nearest neighbor.

According to an embodiment of the present disclosure, there is provided a system, including: a means for processing, the means for processing being configured to perform a method, the method including: selecting, based on a first query vector, a selected method, the selected method being a nearest neighbor selection method; and performing the selected method to select a first nearest neighbor from a data set, based on the first query vector.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
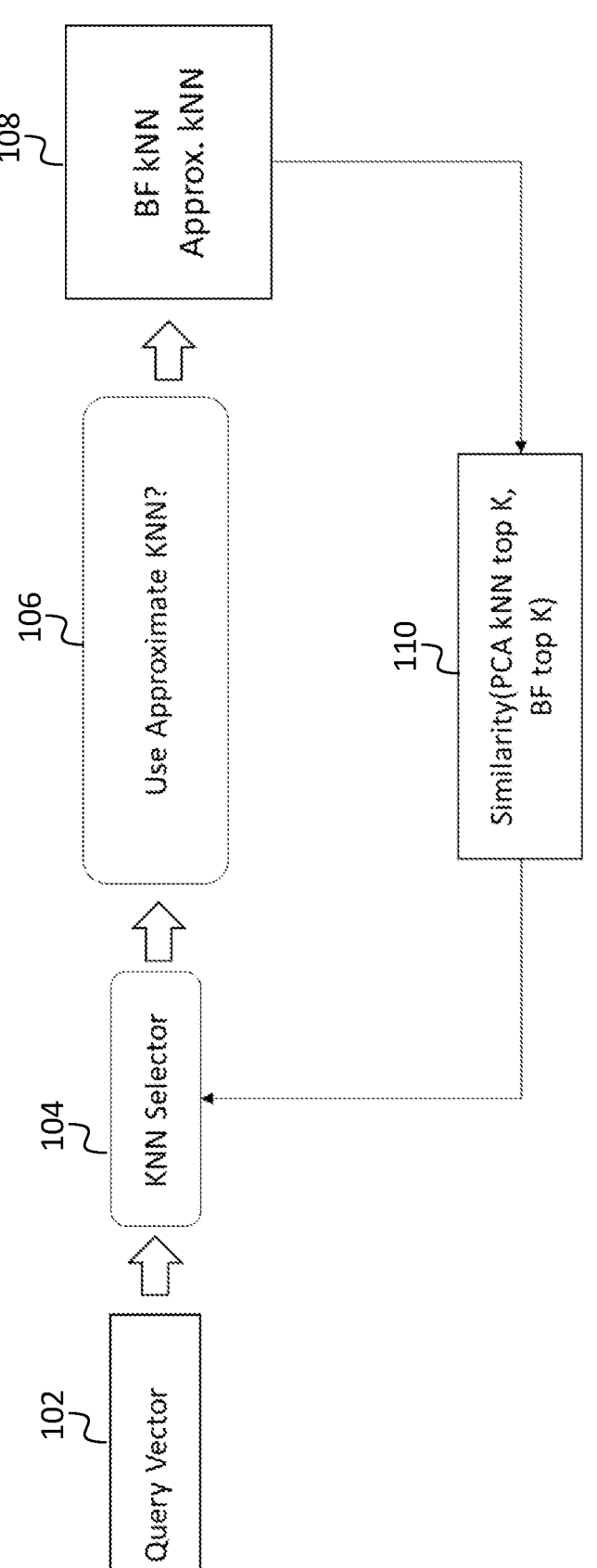
FIG. 1A is a hybrid block diagram and top-level flow chart of a process for finding nearest neighbors, according to an embodiment of the present disclosure.

The detailed description set forth below in connection with the appended drawings is intended as a description of exemplary embodiments of systems and methods for finding nearest neighbors provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A k nearest neighbor (kNN) algorithm may be used for a variety of machine learning use cases, e.g., in edge computing. A k nearest neighbor algorithm may receive, as input, a query vector, and it may find, within a data set (containing a plurality of data vectors) the k vectors that are nearest the query vector, according to a specified measure of distance (e.g., a Euclidean distance). The k nearest neighbor algorithm may return these vectors in a list, in order of distance from the query vector (with, e.g., the nearest neighbor being the first vector in the list). Various algorithms may be used to find the k nearest neighbors, some of which may be exact, and some of which may be approximate. An approximate algorithm may differ from an exact algorithm in that the approximate may return a list of vectors that is not entirely correct (e.g., that includes one or more vectors that are not in fact among the k nearest neighbors, or in which the vectors are not in the correct order). A k nearest neighbor algorithm may have a computational complexity that increases with the dimensionality of the vectors, which may result in high computational cost for high-volume, high-dimensional data. Multi-core central processing units (CPUs) and general purpose graphics processing units (GPGPUs) may be unable to efficiently process data that is high-volume and has high dimensionality. As a result, some k nearest neighbor algorithms may exhibit high execution time and energy consumption.

As such, there may be a need for optimizations suitable for near-storage and edge accelerators. Approximate k nearest neighbor algorithms, as mentioned above, may make tradeoffs between accuracy and speed, resources, and energy usage. In some circumstances, the loss of accuracy of an approximate k nearest neighbor algorithm may result in a noticeable degradation of performance.

Algorithms from the set of k nearest neighbor algorithms may be useful for querying embedding spaces used to represent, for example, images, text, or the like. The set of k nearest neighbor algorithms may include, for example, principal component analysis based filtering (PCAF) k nearest neighbor algorithms, and brute force k nearest neighbor algorithms (BF-KNN). Brute force k nearest neighbor algorithms may be the most expensive computationally and the most accurate (e.g., being perfectly accurate in some embodiments). A brute force k nearest neighbor algorithm may, for example, calculate the respective distances between the query vector and every vector in the data set, and sort the distances to find the k vectors that are nearest to the query vector.

In some embodiments, use cases may include, for example, image recognition (in which, for example, an image corresponding to the query vector may be classified according to a voting mechanism, e.g., by taking a majority voting of the labels of the k nearest neighbors of the image vector), or speech recognition, in which a spoken word or phrase may be classified in an analogous manner.

Approximate k nearest neighbor algorithms may include accelerated k nearest neighbor algorithms, such as principal component analysis based filtering k nearest neighbor algorithms. In a principal component analysis based filtering k nearest neighbor algorithm, the dimensions of the query vector and of the vectors of the data set may be reduced, e.g., through principal component analysis. The approximate k nearest neighbor algorithm may then calculate the respective distances between the reduced-dimension query vector and every reduced-dimension vector in the reduced-dimension data set, and sort the distances to find the k reduced-dimension vectors that are nearest to the query vector. The reduction in dimensions may significantly reduce the computational cost of calculating each of the distances. Because the distance between two reduced-dimension vectors may be different from the distance between the two corresponding vectors having the original dimensions, the list of k nearest neighbors produced by such a k nearest neighbor algorithm may not be entirely correct. In some circumstances, however, a principal component analysis based filtering k nearest neighbor algorithm may produce an accurate list of the set of k nearest neighbors to the query vector.

In some embodiments, therefore, a method is employed to select a method for finding the k nearest neighbors of a query vector, and the selected method is then used to find the k nearest neighbors. The method may be selected by a classifier, which may classify the query vector according to which, of a plurality of candidate k nearest neighbor algorithms, is likely to provide the best combination of accuracy and computational cost for the query vector. For example, the classifier may classify each query vector into one of two classes, a first class, which may be the class of query vectors for which an approximate k nearest neighbor algorithm provides the best combination of accuracy and computational cost (this class may be the class of query vectors that is well represented in a reduced k nearest neighbor space), and a second class, which may be the class of query vectors for which a brute force k nearest neighbor algorithm provides the best combination of accuracy and computational cost (this class may be the class of query vectors that is not well represented in a reduced k nearest neighbor space). The k nearest neighbors may then be found using the method corresponding to the class into which the query vector was classified, e.g., the k nearest neighbors may be found using an approximate k nearest neighbor algorithm if the query vector was classified as being in the first class, and a brute force k nearest neighbor algorithm if the query vector was classified as being in the second class.

FIG. 1A is a hybrid block diagram and flow chart, in some embodiments. The process of the flow chart portion of FIG. 1A may be performed, for example, by a processing circuit (discussed in further detail below). In some embodiments the process may include receiving, at 102, a query vector, using a k nearest neighbor algorithm selector 104 to determine, at 106, whether to use an approximate k nearest neighbor algorithm, and finding, at 108, the k nearest neighbors using either (i) a brute force (BF) k nearest neighbor algorithm or (ii) an approximate k nearest neighbor algorithm. The process may further include occasionally (as discussed in further detail below) finding the k nearest neighbors using both the brute force k nearest neighbor algorithm and the approximate k nearest neighbor algorithm, and calculating, at 110, the similarity between (i) the list of nearest neighbors returned by the brute force k nearest neighbor algorithm and (ii) the list of nearest neighbors returned by the approximate k nearest neighbor algorithm. The calculated similarity may be used to adjust the k nearest neighbor algorithm selector, as discussed in further detail below. In some embodiments, an analogous method may be used to select from among two alternatives other than a brute force (BF) k nearest neighbor algorithm and an approximate k nearest neighbor algorithm, or an analogous method may be used to select from among more than two alternatives.

Figure 1B:
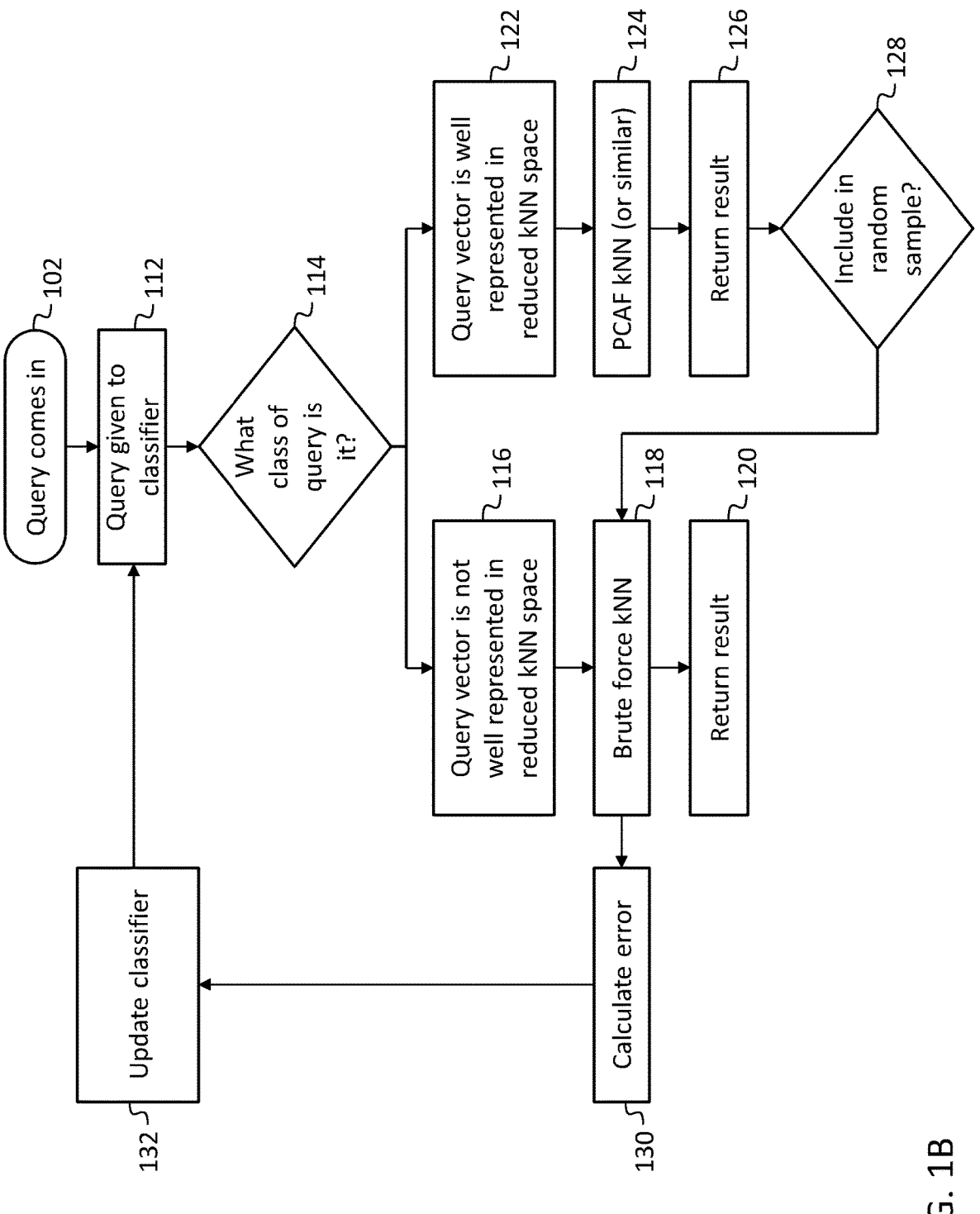
FIG. 1B is a detailed flow chart of a process for finding nearest neighbors, according to an embodiment of the present disclosure.

FIG. 1B shows such a process, in which the selector is a classifier, in greater detail. As used herein, a "classifier" is a machine learning model, such as a neural network, or any other supervised learning algorithm such as the k nearest neighbor, random forest, decision tree, naïve Bayes, logistic regression, and support vector machines. The process includes receiving, at 102, a query vector, giving the query to the classifier at 112, classifying, at 114, the query into one of two classes, the two classes being (i) a class of query vectors that are not well represented in the reduced-dimension k nearest neighbor space (e.g., in which some input feature maps that belong to different categories are mapped to vectors, in the k-dimensional state, that are close together), and (ii) a class of query vectors that are well represented in the reduced-dimension k nearest neighbor space. In embodiments with more than two candidate k nearest neighbor algorithms (e.g., a brute force k nearest neighbor algorithm and several k nearest neighbor algorithms using different degrees of approximation), the classifier may classify the query vector into one of more than two classes, each class corresponding, for example, to a k nearest neighbor algorithm expected to achieve the best compromise between computational cost and accuracy for the query vector. The process further includes, (i) if (at 116) the query vector is classified as being a member of the class of query vectors that are not well represented in the reduced-dimension k nearest neighbor space, using, at 118, a brute force k nearest neighbor algorithm to find the k nearest neighbors, and returning the result, at 120, and (ii) if (at 122) the query vector is classified as being a member of the class of query vectors that are not well represented in the reduced-dimension k nearest neighbor space, using, at 124, an approximate k nearest neighbor algorithm (e.g., a principal component analysis based filtering k nearest neighbor algorithm) to find the k nearest neighbors, and returning the result, at 126.

On-line training of the classifier may also be performed, by a suitable processing circuit (e.g., a processing circuit of a computing system, as discussed below in the context of FIG. 1D), as follows. At 128, when the approximate k nearest neighbor algorithm has been employed to find an approximate list of k nearest neighbors, a determination may be made whether the current query vector is to be added to the training data set (e.g., the "random sample"); if it is, then at 118 the brute force k nearest neighbor algorithm may also be employed to find a list (which may be referred to as a "reference list") of k nearest neighbors, and an error in the approximate list of k nearest neighbors may be calculated, at 130, based on the approximate list of k nearest neighbors and on the reference list of k nearest neighbors. The calculated error may then be used, at 132, to update (or "train" or "retrain") the classifier.

In FIG. 1B, the classifier is shown as a classifier configured to select between two k nearest neighbor algorithms; in some embodiments a larger number of k nearest neighbor algorithms are implemented and the classifier may select from among them. The classifier may be designed for a fixed dataset, or data vectors may be added to the data set if the same embedding mechanism is used to generate the added data vectors. Various measures of distance may be used to define the k nearest neighbors, including (as mentioned above) a Euclidean distance, or a Manhattan distance, or a distance based on a cosine similarity calculation, or any other suitable distance measure.

Figure 1C:
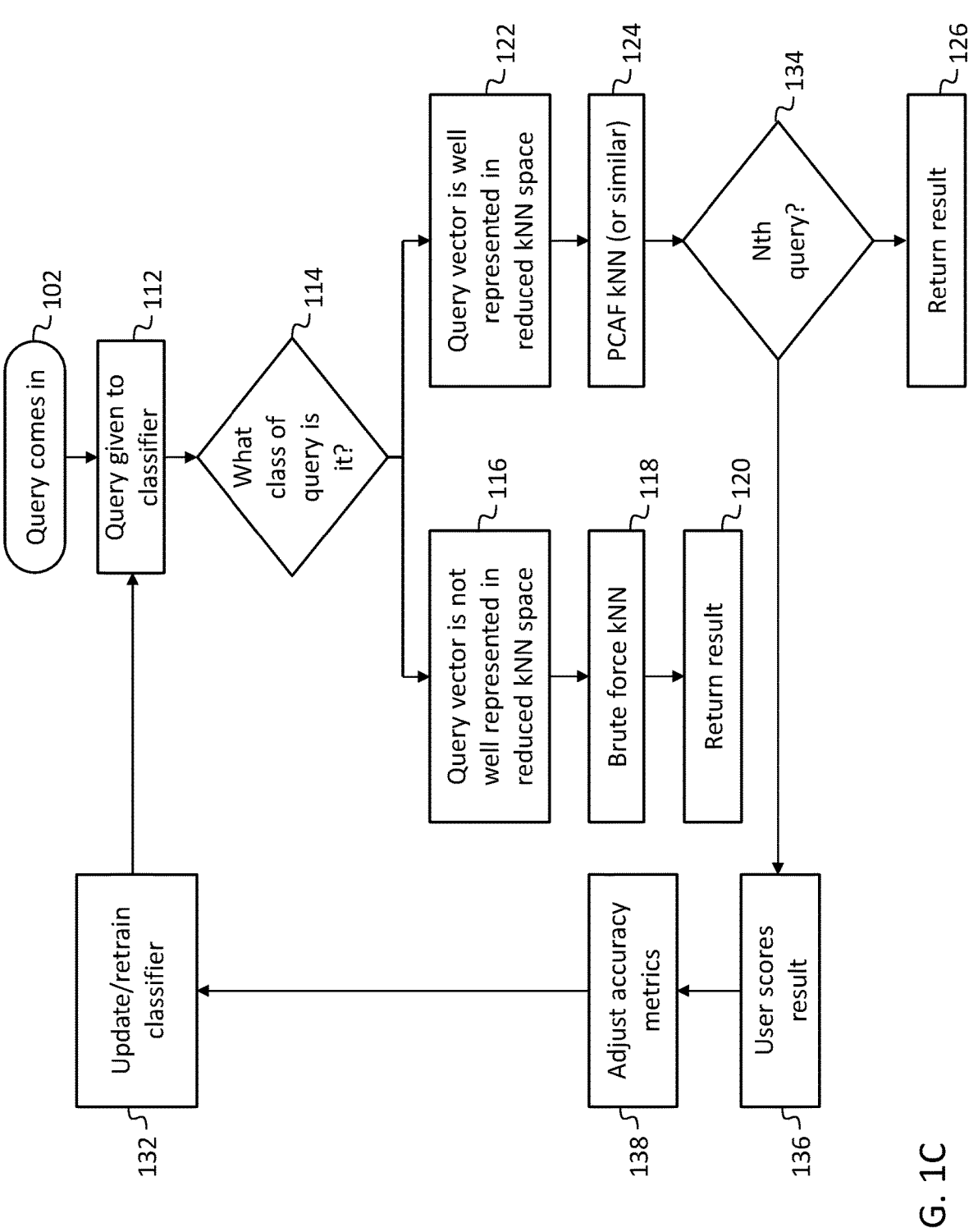
FIG. 1C is a flow chart of a process for finding nearest neighbors, with training based on user input, according to an embodiment of the present disclosure.

The determination of whether the current query vector is to be added to the training data set may be made in several ways. For example, the interval between consecutive query vectors used for training may be a constant (as in the example of FIG. 1C, discussed in further detail below) (e.g., one in N query vectors may be selected for training, with N−1 query vectors being processed between each consecutive pair of query vectors selected for training) or the interval may be selected randomly (as in the example of FIG. 1B) (e.g., the number of query vectors processed between each consecutive pair of query vectors selected for training may be generated by a pseudorandom number generator), or the interval may be selected based on a measure of the difference between the output of the approximate k nearest neighbor algorithm and the output of the brute force k nearest neighbor algorithm.

The measure of the difference between the output of the approximate k nearest neighbor algorithm and the output of the brute force k nearest neighbor algorithm (which may also be referred to as a measure of the error in the output of the approximate k nearest neighbor algorithm) may be calculated or estimated in various ways. For example, a Euclidean distance between (i) the k nearest neighbor vectors found by the brute force k nearest neighbor algorithm and (ii) the k nearest neighbor vectors found by the approximate k nearest neighbor algorithm (e.g., the principal component analysis based filtering k nearest neighbor algorithm) may be employed. Such a Euclidean distance may be defined as the sum of the k pairwise Euclidean distances, each pairwise Euclidean distance being the Euclidean distance (e.g., the square root of the sum of the squares of the element-wise differences) between a respective vector of the list of k nearest neighbor vectors found by the brute force k nearest neighbor algorithm and the corresponding vector of the list of k nearest neighbor vectors found by the approximate k nearest neighbor algorithm. As is the case in defining the distance for purposes of finding nearest neighbors, other measures of distance (e.g., the Manhattan distance, or a distance based on a cosine similarity calculation) may be used to calculate the error.

The calculated error may be compared to a threshold, to determine whether it is sufficiently small that the computational cost savings obtained by using an approximate k nearest neighbor algorithm justify the use of an approximate k nearest neighbor algorithm. The conclusion (in the form of a binary indication, indicating either that the classifier made the correct decision or that the classifier did not make the correct decision) may then be fed (as shown at 132 in FIG. 1B) to the classifier for use in the training (or updating, or re-training) of the classifier (e.g., using back-propagation). In some embodiments, the error may be determined based on the query vector fit into the principal component analysis space instead of, or in addition to, a measure of the distance between (i) the k nearest neighbor vectors found by the brute force k nearest neighbor algorithm and (ii) the k nearest neighbor vectors found by the approximate k nearest neighbor algorithm.

The correctness of the classification decision made by the classifier may be assessed in several other ways, other than by comparing the error in the list of k nearest neighbors to a threshold. For example, referring to FIG. 1C, in some embodiments, user input may be used to determine whether a classification decision made by the classifier was correct. The process of FIG. 1C includes receiving, at 102, a query vector, giving the query to the classifier at 112, classifying, at 114, the query into one of two classes, the two classes being (i) a class of query vectors that are not well represented in the reduced-dimension k nearest neighbor space, and (ii) a class of query vectors that are well represented in the reduced-dimension k nearest neighbor space. The process further includes, (i) if (at 116) the query vector is classified as being a member of the class of query vectors that are not well represented in the reduced-dimension k nearest neighbor space, using, at 118, a brute force k nearest neighbor algorithm to find the k nearest neighbors, and returning the result, at 120, and (ii) if (at 122) the query vector is classified as being a member of the class of query vectors that are well represented in the reduced-dimension k nearest neighbor space, using, at 124, an approximate k nearest neighbor algorithm (e.g., a principal component analysis based filtering k nearest neighbor algorithm) to find the k nearest neighbors, and returning the result, at 126.

In addition to returning the result, at 126, a determination may be made, at 134, whether the current query is the Nth query (since updating of the classifier was last performed); if it is, then at 136, user input may be received from a user, who may score the result (e.g., assess how well the k nearest neighbors match the query vector). Based on this user input, the accuracy metrics may be adjusted, at 138, and the classifier may be updated or retrained at 132. For example, each of (i) the query vector and (ii) the vectors of the data set may correspond to a respective image. The image corresponding to the query vector and the images corresponding to the k nearest neighbors selected from the data set by the method selected by the classifier may both be displayed to the user, and the user may be prompted to assess whether the images are similar. If, according to the user, they are, then the classification decision may be deemed correct; otherwise it may be deemed incorrect.

As another example, the principal component analysis conversion error rate may be used. Principal component analysis may involve reducing the number of dimensions in a vector by creating a smaller vector space that best represents the original vector space. Converting the vector to its principal component analysis space representation may net (in addition to the reduced-dimension vector) an error result. This error may indicate whether the vector maps to the principal component analysis space well, and, as such, this error may be used to determine whether a principal component analysis based filtering k nearest neighbor algorithm search will net good results.

As another example, linear discriminant analysis (LDA) may be used to determine the minimum number of vectors that can represent the data set to be queried. The classification error, in such an embodiment, may be a mechanism of training the classifier and determining fitness if linear discriminant analysis was used.

In some embodiments, the method is extended to deep learning based approaches. In such an embodiment, a k nearest neighbor algorithm may be used in combination with deep embeddings, which may be obtained from pretrained models. Deep embeddings may result in more accurate lookups. The classifier may, in such an embodiment, learn (e.g., learn to classify) (i) common embeddings for text, image, and other types of data for cross-modal lookups, (ii) text embedding (which may be employed to extract textual features), (iii) image embedding (which may be employed to extract image features), or (iv) features mapped to a common latent space by using cross-modal joint embedding (e.g., canonical correlation analysis).

Some embodiments may be used for various use cases, including, e.g., computational storage devices, in which the methods described herein may be employed for acceleration of image lookup, or acceleration of searches on large databases stored on the device, and in which these methods may benefit from near data compute. Another relevant use case may be image recognition, in which a k nearest neighbor algorithm may be employed for ranking images based on their relatedness to a query image, and in which the ability to perform such ranking efficiently may be important, especially when a large number of queries are to be processed. Other embeddings spaces, such as word embeddings, may be queried in an analogous manner.

Another relevant use case may be recommendation systems, in which k nearest neighbor algorithms may be employed, especially at large scale organizations. Data science and data mining may also be relevant use cases, in which k nearest neighbor algorithms may be employed by data scientists who may not always have a profound understanding of the different forms of k nearest neighbor algorithms. In such a use case, a system that chooses a k nearest neighbor algorithm intelligently may allow their work to be done more efficiently and with the correct type of k nearest neighbor algorithm; such a system may also allow for unlabeled datasets to be effectively queried.

Figure 1D:
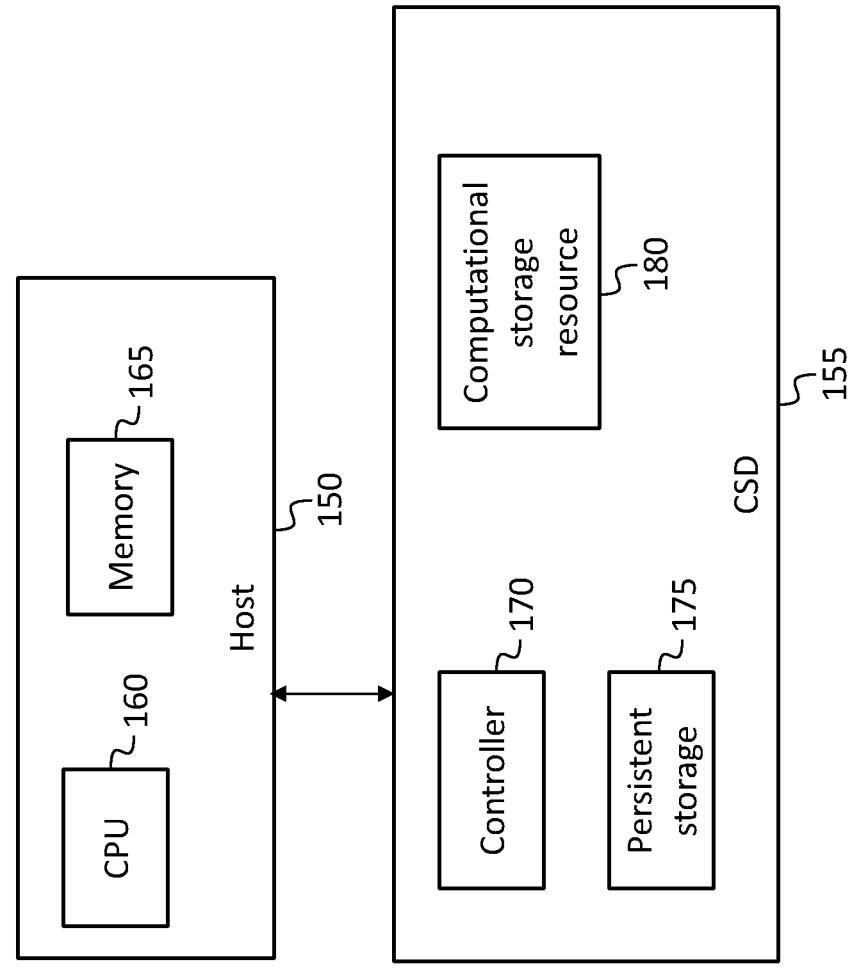
FIG. 1D is a block diagram of a portion of a computing system, according to an embodiment of the present disclosure.

FIG. 1D shows a host 150 connected to a persistent storage device 155 (e.g., a solid state drive (SSD) or (as illustrated) a computational storage device (CSD)). The host may include a central processing unit (CPU) 160 (which may be a processing circuit) and a host memory 165 connected to the central processing unit 160. The persistent storage device 155 may include a controller 170, persistent storage 175, and, if it is a computational storage device, the persistent storage device 155 may include one or more computational storage resources 180 (each of which may be or include a processing circuit (e.g., a microprocessor, or a field programmable gate array (FPGA) or an application-specific integrated circuit (ASIC)) for performing computations on data received from the host or retrieved from the persistent storage 175. Methods described herein may be performed by the central processing unit 160, or by the controller 170, or by the one or more computational storage resources 180.

Figure 2B:
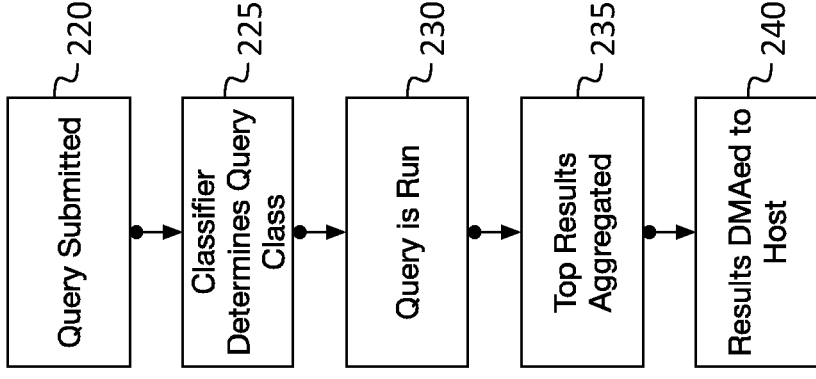
FIG. 2B is a flow chart of a process for finding nearest neighbors in computational storage, according to an embodiment of the present disclosure.
Figure 2A:
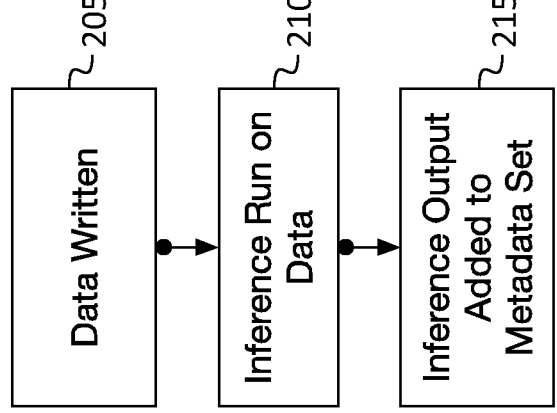
FIG. 2A is a flow chart of a write path in computational storage, according to an embodiment of the present disclosure.

FIGS. 2A and 2B illustrate the use of some embodiments in a computational storage device. The entire path may be run on the computational storage device, and inference may be accelerated, e.g., performed in the computational storage device, instead of on a host connected to the computational storage device. FIG. 2A shows a method that may be used in the write path of a storage device. At 205, data may be written to the computational storage device, at 210, inference may be run on the data, within the computational storage device, and the output of the inference may be added, at 215, to the metadata set stored on the computational storage device. In the embodiment of FIG. 2A, inference (which may result in the representation in the embeddings space) is accelerated, and the query classifier is accelerated.

FIG. 2B shows a method that may be used in the read and query path. At 220, a query is submitted to the computational storage device (e.g., by a host connected to the computational storage device). The query may be submitted, for example, using a protocol that conforms with a standardized specification, such as the computational storage nonvolatile memory express (CS NVMe) protocol. At 225, the classifier, which runs in the computational storage device, determines the class of the query, at 230, the query is run (e.g., by performing a k nearest neighbor algorithm), at 235, the top results are aggregated, and at 240, the results are transmitted to the host via direct memory access (DMA). In the process illustrated in FIG. 2B, the computational storage device automatically accelerates inference and updates the metadata used by the system for calculating the k nearest neighbors (e.g., a system employing a classifier, such as that illustrated in FIG. 1B).

Figure 3:
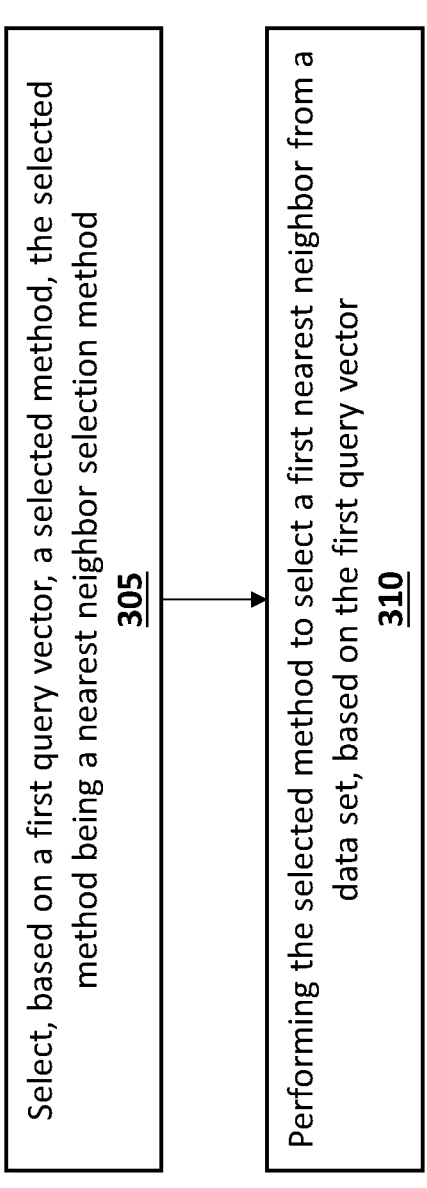
FIG. 3 is a flow chart of a process for finding nearest neighbors using a selected method, according to an embodiment of the present disclosure.

FIG. 3 is a flow chart of a method, in some embodiments. The method includes selecting, at 305, based on a first query vector, a selected method, the selected method being a nearest neighbor selection method; and performing, at 310, the selected method to select a first nearest neighbor from a data set, based on the first query vector.

As used herein, a computational storage device refers to a storage device that supports computational tasks. For example, a computational storage device may include a storage element (e.g., non-volatile memory, such as flash memory, etc.) and a compute element (e.g., a central processing unit (CPU), graphics processing unit (GPU), a field programmable gate array (FPGA), an application specific integrated circuit (ASIC), processor core, etc.) and be configured to support storage of data at the compute element and execution of computational tasks at the compute element. Accordingly, a computational storage device may provide storage capabilities to a host device (e.g., a computing device) and may support offloading of computational tasks from the host device to the computational storage device.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A system, comprising:
a processing circuit, the processing circuit being configured to perform a method, the method comprising:
selecting, based on a first query vector, a selected method, the selected method being a nearest neighbor selection method; and
performing the selected method to select a first nearest neighbor from a data set, based on the first query vector.

2. The system of statement 1, wherein the selecting of the selected method comprises selecting, by a classifier, the selected method.

3. The system of statement 1 or statement 2, wherein the method further comprises performing a second method, different from the selected method, to select a second nearest neighbor from the data set, based on the first query vector.

4. The system of statement 2 or statement 3, wherein the method further comprises training the classifier based on a difference between the first nearest neighbor and the second nearest neighbor.

5. The system of any one of statements 2 to 4, wherein the classifier comprises a neural network, and the training comprises performing back-propagation.

6. The system of any one of statements 3 to 4, wherein the method further comprises
performing a third method to select a third nearest neighbor from a data set, based on a second query vector;
performing a fourth method, different from the third method, to select a fourth nearest neighbor from the data set, based on the second query vector; and
training the classifier based on a difference between the third nearest neighbor and the fourth nearest neighbor.

7. The system of statement 6, further comprising processing a first number of query vectors between the processing of the first query vector and the processing of the second query vector.

8. The system of statement 7, wherein the first number is a constant.

9. The system of statement 7, wherein the first number is generated by a pseudorandom number generator.

10. The system of statement 7, wherein the first number is based on a measure of a difference between output of the selected method and output of the second method.

11. The system of statement 10, wherein the measure of the difference comprises a Euclidean distance.

12. The system of statement 10, wherein the measure of the difference comprises a Manhattan distance.

13. The system of statement 10, wherein the measure of the difference comprises a cosine similarity.

14. The system of any one of the preceding statements, wherein the selecting of the selected method comprises selecting the selected method based on a principal component analysis conversion error rate.

15. The system of any one of statements 1 to 13, wherein the selecting of the selected method comprises selecting the selected method based on a linear discriminant analysis.

16. A method, comprising:
selecting, based on a first query vector, a selected method, the selected method being a nearest neighbor selection method; and
performing the selected method to select a first nearest neighbor from a data set, based on the first query vector.

17. The method of statement 16, wherein the selecting of the selected method comprises selecting, by a classifier, the selected method.

18. The method of statement 16 or statement 17, further comprising performing a second method, different from the selected method, to select a second nearest neighbor from the data set, based on the first query vector.

19. The method of statement 17 or statement 18, further comprising training the classifier based on a difference between the first nearest neighbor and the second nearest neighbor.

20. A system, comprising:
a means for processing, the means for processing being configured to perform a method, the method comprising:
selecting, based on a first query vector, a selected method, the selected method being a nearest neighbor selection method; and
performing the selected method to select a first nearest neighbor from a data set, based on the first query vector.

Although exemplary embodiments of systems and methods for finding nearest neighbors have been specifically described and illustrated herein, many modifications and variations will be apparent to those skilled in the art. Accordingly, it is to be understood that systems and methods for finding nearest neighbors constructed according to principles of this disclosure may be embodied other than as specifically described herein. The invention is also defined in the following claims, and equivalents thereof.

What is claimed is:

1. A system, comprising:
a processor, the processor being configured to perform a method, the method comprising:
receiving, by the processor, a first query vector;
determining that the first query vector belongs to a first class of query vectors having a first computational characteristic that is different from a second computational characteristic of query vectors of a second class;
selecting, by a machine learning model comprising a classifier, based on the first class and from between at least a first method providing a first performance and a second method providing a second performance that is different from the first performance, the first method as a selected method based on the first performance being different from the second performance, the selected method being a nearest neighbor selection method;
performing the selected method to select a first nearest neighbor from a data set, based on the first query vector;
performing the second method, different from the selected method, to select a second nearest neighbor from the data set, based on the first query vector; and
training the classifier based on a difference between the first nearest neighbor and the second nearest neighbor, wherein the selecting of the selected method comprises selecting, by the classifier, the selected method.

2. The system of claim 1, wherein the classifier comprises a neural network, and the training comprises performing back-propagation.

3. The system of claim 1, wherein the method further comprises performing a third method to select a third nearest neighbor from the data set, based on a second query vector;

performing a fourth method, different from the third method, to select a fourth nearest neighbor from the data set, based on the second query vector; and training the classifier based on a difference between the third nearest neighbor and the fourth nearest neighbor.

4. The system of claim 3, further comprising processing a first number of query vectors between the processing of the first query vector and the processing of the second query vector.

5. The system of claim 4, wherein the first number is a constant.

6. The system of claim 4, wherein the first number is generated by a pseudorandom number generator.

7. The system of claim 4, wherein the first number is based on a measure of a difference between an output of the selected method and an output of the second method.

8. The system of claim 7, wherein the measure of the difference comprises a Euclidean distance.

9. The system of claim 7, wherein the measure of the difference comprises a Manhattan distance.

10. The system of claim 7, wherein the measure of the difference comprises a cosine similarity.

11. The system of claim 1, wherein the selecting of the selected method comprises selecting the selected method based on a principal component analysis conversion error rate.

12. The system of claim 1, wherein the selecting of the selected method comprises selecting the selected method based on a linear discriminant analysis.

13. A method, comprising:

receiving a first query vector;

determining that the first query vector belongs to a first class of query vectors having a first computational characteristic that is different from a second computational characteristic of query vectors of a second class;

selecting, by a machine learning model comprising a classifier, based on the first class and from between at least a first method providing a first energy usage and a second method providing a second energy usage that is different from the first energy usage, the first method as a selected method based on the first energy usage being different from the second energy usage, the selected method being a nearest neighbor selection method;

performing the selected method to select a first nearest neighbor from a data set, based on the first query vector;

performing the second method, different from the selected method, to select a second nearest neighbor from the data set, based on the first query vector; and training the classifier based on a difference between the first nearest neighbor and the second nearest neighbor, wherein the selecting of the selected method comprises selecting, by the classifier, the selected method.

14. A system, comprising:

a means for processing, the means for processing being configured to perform a method, the method comprising:

receiving, by the means for processing, a first query vector;

determining that the first query vector belongs to a first class of query vectors having a first computational characteristic that is different from a second computational characteristic of query vectors of a second class;

selecting, by a machine learning model comprising a classifier, based on the first class and from between at least a first method providing a first accuracy and a second method providing a second accuracy that is different from the first accuracy, the first method as a selected method based on the first accuracy being different from the second accuracy, the selected method being a nearest neighbor selection method;

performing the selected method to select a first nearest neighbor from a data set, based on the first query vector;

performing the second method, different from the selected method, to select a second nearest neighbor from the data set, based on the first query vector; and training the classifier based on a difference between the first nearest neighbor and the second nearest neighbor, wherein the selecting of the selected method comprises selecting, by the classifier, the selected method.

* * * * *